United States Patent Office 3,538,751
Patented Nov. 10, 1970

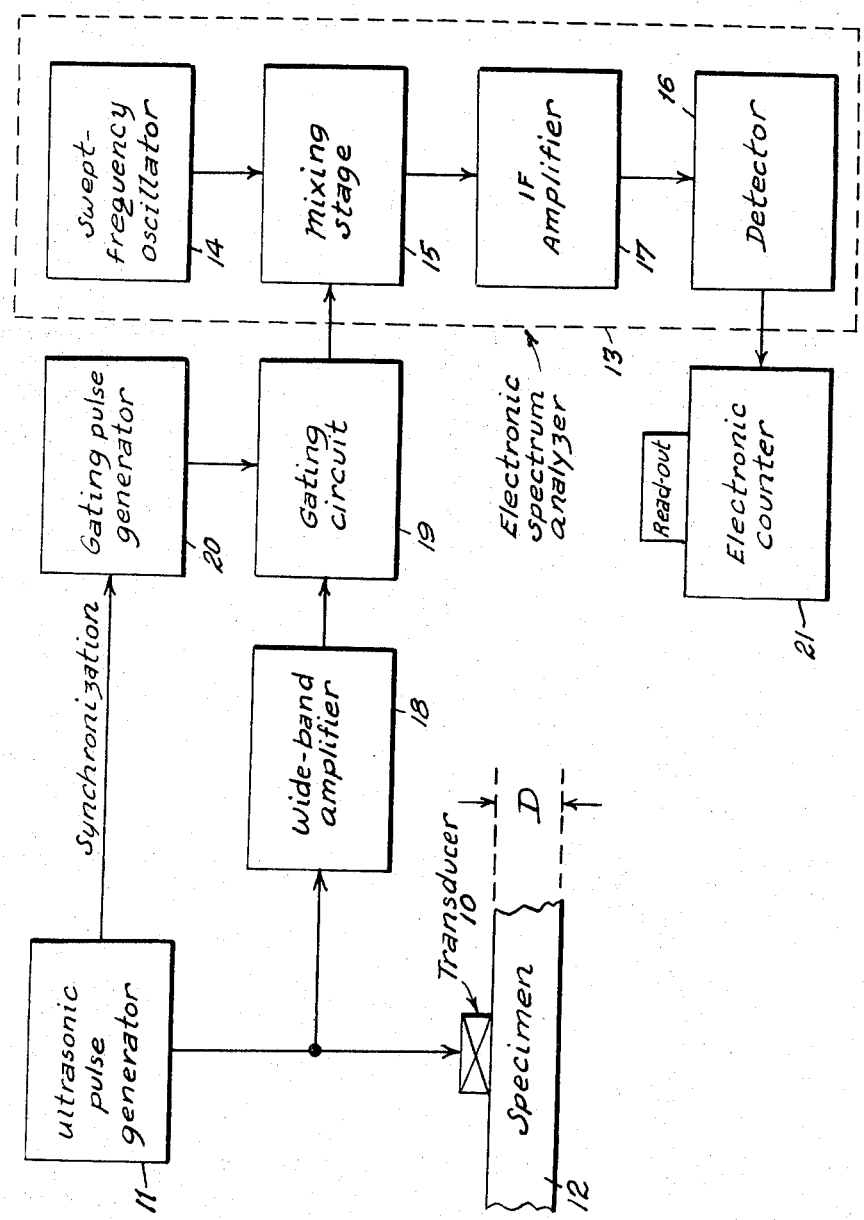

3,538,751
DIRECT READING ULTRASONIC THICKNESS GAGE
Otto R. Gericke, Medfield, Mass., assignor to the United States of America as represented by the Secretary of the Army
Filed May 17, 1968, Ser. No. 730,187
Int. Cl. G01n 29/00
U.S. Cl. 73—67.8                    3 Claims

ABSTRACT OF THE DISCLOSURE

A direct reading ultrasonic thickness gage that requires no manual operation of the electronic circuitry consisting of an ultrasonic pulse excited piezoelectric transducer coupled to a specimen and to an electronic spectrum analyzer having an electronic counter coupled to the output thereof whereby a direct digital read-out of the specimen thickness is obtained.

---

The invention described herein may be manufactured, used and licensed by or for the Government for governmental purposes without the payment to me of any royalty thereon.

With currently existing ultrasonic test equipment for thickness measuring neither the pulse period or its reciprocal, the pulse repetition frequency can be indicated automatically. In such equipment, the measurement of the pulse period involves starting and stopping a calibrated oscillator at the beginning and the end of the period and counting the number of cycles generated during the period, a process which requires manual adjustment of electronic circuitry during each test. The measurement of pulse repetition frequency requires manual adjustment of a resonance circuit each time a test is made.

An object of the invention is an ultrasonic thickness gage which does not require manual adjustment of the electronic circuitry thereof.

Another object of the invention is an ultrasonic thickness gage wherein direct digital read-out of the specimen thickness is obtained.

A still further object of the invention is an ultrasonic thickness gage wherein the electronic circuitry thereof, electronic Fourier transformation of the ultrasonic pulse sequence derived from the specimen being gaged achieves direct read-out of the specimen thickness.

The invention will be more fully understood and its objects and advantages further appreciated by referring now to the detailed description taken in conjunction with the sole figure in the drawing.

Referring now to the sole figure in the drawing which is a block diagram of the direct reading ultrasonic thickness gage, a highly damped piezoelectric transducer 10, excited by an ultrasonic pulse generator 11 connected thereto, injects ultrasonic pulses of short duration into specimen 12, for example, a metal plate, to determine the thickness D thereof. After entering specimen 12, the ultrasonic pulse is repeatedly reflected back and forth between the parallel surfaces of the specimen separated by the dimension D until its energy is dissipated. During this reverberation process, piezoelectric transducer 10, which also acts as an ultrasonic receiver, generates a short voltage pulse each time the ultrasonic pulse strikes upon the specimen surface to which the piezoelectric transducer 10 is coupled. Thus, following the emission of the initial excitation pulse, a sequence of electrical pulses is produced by the piezoelectric transducer. The time interval T between two consecutive pulses of this sequence is equivalent to the specimen thickness according to (1) $$T = \frac{2D}{V}$$

where V represents the longitudinal ultrasonic wave velocity in the material of the specimen. For a specific material, the longitudinal ultrasonic wave velocity is usually constant within a wide range of ultrasonic frequencies and the specimen thickness D can be determined by measuring the pulse period T or its reciprocal, the pulse repetition frequency F since (2) $$T = \frac{1}{F}$$

with currently existing ultrasonic test equipment for thickness measuring purposes neither T nor F can be indicated automatically. The measurement of T involves starting and stopping a calibrated oscillator at the beginning and the end of the period T and counting the number of cycles generated during the period T, a process which requires manual adjustment of the electronic circuitry during each test. The measurement of F, on the other hand, requires manual adjustment of a resonance circuit each time a test is made. Manual adjustment of electronic equipment is no longer required with the ultrasonic thickness gage of the instant invention because it yields a direct digital read-out of specimen thickness as soon as piezoelectric transducer 10 is coupled to the specimen. This direct read-out is obtained through the method of electronic Fourier transformation accomplished by electronic spectrum analyzer 13 consisting of swept-frequency oscillator 14 coupled to mixing stage 15 the output of which is coupled to detector 16 through intermediate amplifier 17. The sequence of pulses with a period T produced by piezoelectric transducer 10 in response to the ultrasonic pulse that is repeatedly reflected back and forth between the parallel surfaces of the specimen is coupled to mixing stage 15 through wide-band amplifier 18 which amplifies the pulses of said sequence and which has its input connected to piezoelectric transducer 10 and its output to mixing stage 15 through gating circuit 19. Gating circuit 19 coupled to and actuated by gating pulse generator 20 running synchronously with ultrasonic pulse generator 11 eliminates the initial pulse from the signal fed into mixing stage 15. If the repetition rate of the swept-frequency oscillator is R and the range of frequencies over which it sweeps is S, an input pulse sequence with a period T gives rise to an output pulse sequence with a period (3) $$T^* = \frac{1}{RST}$$

which by incorporating equation 1, can be written (4) $$T^* = \frac{V}{2RSD}$$

If the swept-frequency oscillator 14 is adjusted so that (5)                $$2RS = V$$

hence it is obtained (6) $$T^* = \frac{1}{D} \text{ or } F^* = \frac{1}{T^*} = D$$

Hence, electronic counter 21 coupled to the output of detector 16 measuring the output pulse repetition frequency F* available at the output of detector 16 will indicate the specimen thickness directly in the digital read-out thereof. According to Equation 5, R, the repetition rate of swept-frequency oscillator 14, and S, the range of frequencies over which the swept-frequency oscillator sweeps, have to be adjusted for a certain ultrasonic velocity V, that is, for a specific material, but once this has been accomplished, all measurements are completely automatic as long as always the same material is involved.

Although a specific embodiment of the invention has been illustrated and described, it will be understood that this is but illustrative and that various modifications may be made therein without departing from the spirit of the invention and the scope of the claims.

I claim:

1. A direct reading ultrasonic thickness gage wherein the output pulse repetition frequency thereof provides a direct measurement of the specimen thickness comprising the combination of: a piezoelectric transducer coupled to one surface of the specimen; an ultrasonic pulse generator coupled to an exciting the piezoelectric transducer which injects ultrasonic pulses of short duration into the specimen in response to the excitation and generates a voltage pulse each time the injected ultrasonic pulse strikes upon said one surface; a wide-band electronic amplifier for amplifying the sequence of voltage pulses generated by the piezoelectric transducer coupling the piezoelectric transducer through gating means to one input of a mixer stage of an electronic spectrum analyzer comprising said mixer stage, a swept frequency oscillator coupled to another input of said mixer stage and adjustable so that twice the product of its repetition rate and range of frequencies over which said oscillator sweeps is equal to the longitudinal ultrasonic velocity of the specimen material, a detector, and an intermediate frequency amplifier coupling the output of said mixer stage to said detector; the output pulse repetition frequency of said spectrum analyzer being indicative of the specimen thickness; and means for measuring said output pulse repetition frequency whereby a direct digital read-out of the specimen thickness is obtained.

2. The invention in accordance with claim 1 wherein said gating means comprises a gating circuit having coupled thereto a gating pulse generator synchronized with said ultrasonic pulse generator whereby the initial voltage pulse from the signal fed said mixing stage is eliminated.

3. The invention in accordance with claim 2 wherein said means for measuring the output pulse repetition frequency of the electronic spectrum analyzer comprises an electronic counter coupled to the output of said detector and provided with a digital read-out.

References Cited

UNITED STATES PATENTS

| 3,135,942 | 6/1964 | Tucker et al. | 340—3 |
| 3,407,649 | 10/1968 | Dickinson | 73—67.5 |
| 3,431,551 | 3/1969 | Rollwitz et al. | 73—67.8 X |

RICHARD C. QUEISSER, Primary Examiner

ARTHUR E. KORKOSZ, Assistant Examiner